United States Patent [19]

Hildebrandt

[11] Patent Number: 5,423,682

[45] Date of Patent: Jun. 13, 1995

[54] NUMBERING SYSTEM TEACHING AID

[76] Inventor: Raymond E. Hildebrandt, 7213 Huntcliff, West Bloomfield, Mich. 48322

[21] Appl. No.: 184,928

[22] Filed: Jan. 24, 1994

[51] Int. Cl.6 .............................................. G09B 1/14
[52] U.S. Cl. .................................. 434/195; 434/203; 434/207
[58] Field of Search ............... 434/195, 203, 207, 210, 434/204, 191, 188

[56]  References Cited

U.S. PATENT DOCUMENTS 3,908,287  9/1975  Darnell ............................ 434/210 X
3,995,378 12/1976  Darnell ............................... 434/203

FOREIGN PATENT DOCUMENTS 0000589 of 1900 United Kingdom ................ 434/195

Primary Examiner—Gene Mancene
Assistant Examiner—Jeffrey A. Smith
Attorney, Agent, or Firm—John R. Benefiel

[57]  ABSTRACT

A teaching aid for teaching young children counting in the tens numbering systems, in which four side by side stacks of nine blocks are each slidable on respective rods held in a frame, each of the nine blocks having one face of each block in the stack imprinted in order with a cardinal number, the blocks in the second, third, and fourth stacks also marked respectively with one, two, and three zeros to the left of the cardinal number appearing thereon. Each of the cardinal numbers on the blocks in each stack are in distinct colors, the zeros color matched to the color of the cardinal number of the corresponding place on the adjacent stack. The blocks in each stack are progressively sized wider to the left in proportion to the number of number and zero digits imprinted thereon.

8 Claims, 2 Drawing Sheets

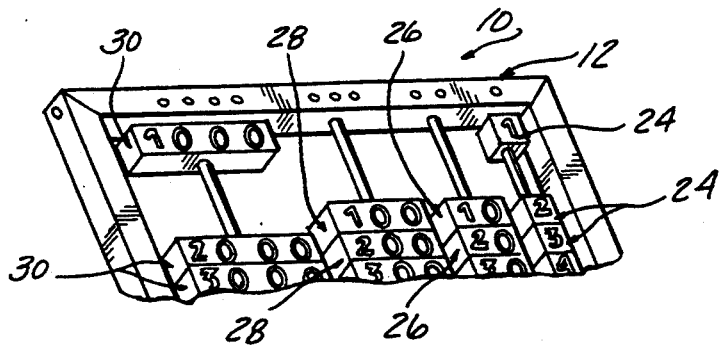
FIG -3
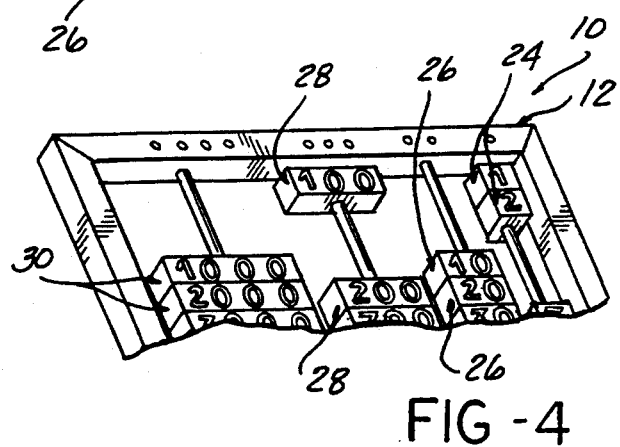
FIG -4
FIG -5A
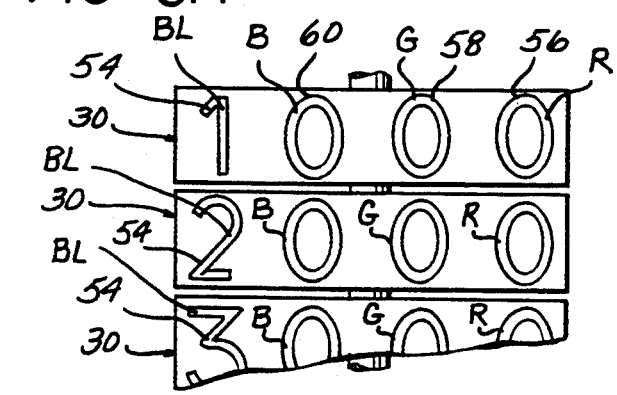
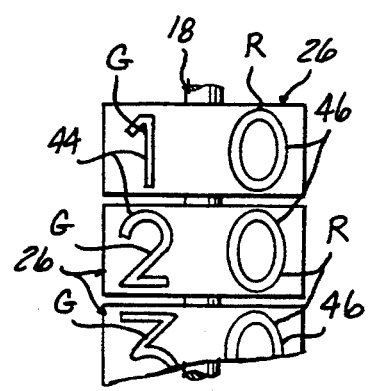
FIG -5C
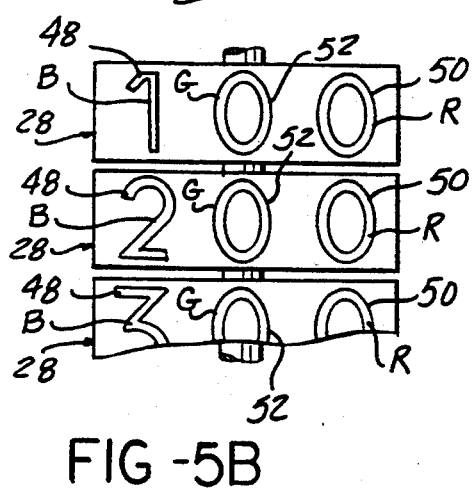
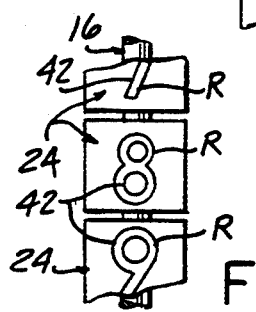
FIG -5B
FIG -5D

NUMBERING SYSTEM TEACHING AID

BACKGROUND OF THE INVENTION

This invention concerns teaching devices, and more particularly a device for teaching young children counting in the decimal or tens number system.

DESCRIPTION OF THE PRIOR ART

The Oriental abacus is an ancient device consisting of stacked grouping of beads slidably mounted on parallel rods or in grooves, the stacks arranged side by side. The abacus is conveniently usable to rapidly add and subtract numbers. The original abacus counted in groups of five, but also has been adapted to the western tens or decimal number system, see U.S. Pat. No. 465,811 issued on Dec. 22, 1991, for an "Adding Machine".

While useful as an adding-subtracting device, the abacus is of limited value in teaching counting or the numbering system to small children.

There is one characteristic of the abacus that does lend itself to teaching children, and that is the simple act of sliding beads to represent counting. The visual tactile nature of the act enhances the speaking and hearing involved in counting.

There thus have heretofore been devised math teaching aids which involve the sliding of objects on parallel rods.

See U.K. patent 1,124,389 published on Aug. 21, 1968 for "Improvements Relating to an Abacus" for such a device.

The present inventor has realized that there is a great potential in an arrangement of sliding stacks of elements in teaching young children basic counting and numbering concepts. The devices heretofore proposed have been relatively complex, and do not depict the nature of our number system's stacking of groups of ten. In addition, they do not cater to the individual number identification necessary for early memory training.

The object of the present invention is to provide a teaching aid utilizing some characteristics of the abacus for teaching young children the basics of counting in the tens numbering system.

SUMMARY OF THE INVENTION

The above object and others which will be understood upon a reading of the following specification and claims are achieved by a teaching device consisting of side by side stacks of nine blocks each because "10" in our number system is a promotion to the next stacking column of tens. Each block is slidable but non rotatably mounted as by being recited on a respective one of a series of side by side parallel rods held in a surrounding frame.

The blocks in each stack are of uniform height but are of progressively greater width from the right most stack, to the left. The purpose of using blocks in each stack is to allow each to be imprinted in order on the outward face with the cardinal numbers one through nine representing units, tens, hundreds, and thousands in the respective stacks of each block. A clearance space on each rod allows shifting of each of the blocks in each stack on the supporting rod from one side of the frame to the other.

Each of the units blocks are imprinted with a respective cardinal number from one to nine only, and in a particular color.

The tens stack of blocks are also each imprinted in order with a respective cardinal number in a second particular color different from the color of the units imprinting, but a zero is also imprinted to the right of each cardinal number in a color matching the units blocks cardinal number imprinting.

Each of the blocks in the hundreds stack is imprinted in order with a respective cardinal number 1-9 in a third particular color differing from the first and second colors of the numbers imprinting on the units and tens blocks. These blocks also are each imprinted with two zeros to the right of each number, each zero imprinted in the respective first and second colors of the tens and units blocks number imprintings.

The stack of blocks in the thousands are also each imprinted in order with the respective cardinal numbers 1-9 in a fourth particular color differing from the first, second, and third colors of the units, tens, and hundreds blocks, and also with three adjacent zeros to the right of each numeral, each imprinted in the respective colors of the number imprintings of the blocks in the hundreds, tens, and units stacks.

The blocks in each stack of the units, tens, hundreds and thousands are of progressively increasing width compared to the blocks in the stack to the right, in proportion to the width required to accommodate the increasing total of digits in their respective imprintings including the number of zeros in their respective imprinting.

While an increase in block size approximating the space needed for imprinting additional numbers digits is convenient, it is the use of block size increase that itself conveys the distinct difference and increase of quantity of the various stacking groups in our tens number system.

This teaching aid very effectively visually demonstrates the relationship between counting in numbers of each order of magnitude, and may be used in a manner resembling in some respects an oriental abacus in the conduct of simple counting lessons.

Each number may be counted by the successive sliding of individual blocks in each stack in correspondence to the count, in each place or order of magnitude of the total count number. The matching of the color of the zeros to the cardinal numbers in the lower order cardinal numbers effectively demonstrates the how numbers of progressively higher orders of magnitude are arrived at.

The blocks in all of the stacks are restrained against rotation so as to always present the imprinted face outwardly during sliding movement on the rods.

The blocks may be restrained against rotation while being slid on the rods as by providing a rear backing panel closely spaced to the rear face of the blocks, or by providing non round rods received in complementary shaped and closely fit through openings in the blocks.

The blocks may also be slid in grooves formed in a supporting structure.

DESCRIPTION OF THE DRAWINGS

FIG. 3 is a fragmentary perspective view of the upper portion of the teaching aid of FIG. 1 demonstrating a count involving the "thousands" and "units" block stack.

FIG. 4 is a fragmentary perspective view of the teaching aid of FIG. 1 showing a count involving the "hundreds" and "units" block stack.

FIGS. 5A-5D are fragmentary enlarged plan views of each of the thousands, hundreds, tens, and units block stacks, depicting in detail the color coding of the number imprinting on each block in each respective stack.

DETAILED DESCRIPTION

In the following detailed description, certain specific terminology is employed for the sake of clarity and a particular embodiment described in accordance with the requirements of 35 USC 112, but it is to be understood that the same is not intended to be limited inasmuch as the invention is capable of taking many forms and variations within the scope of the appended claims.

Figure 1:
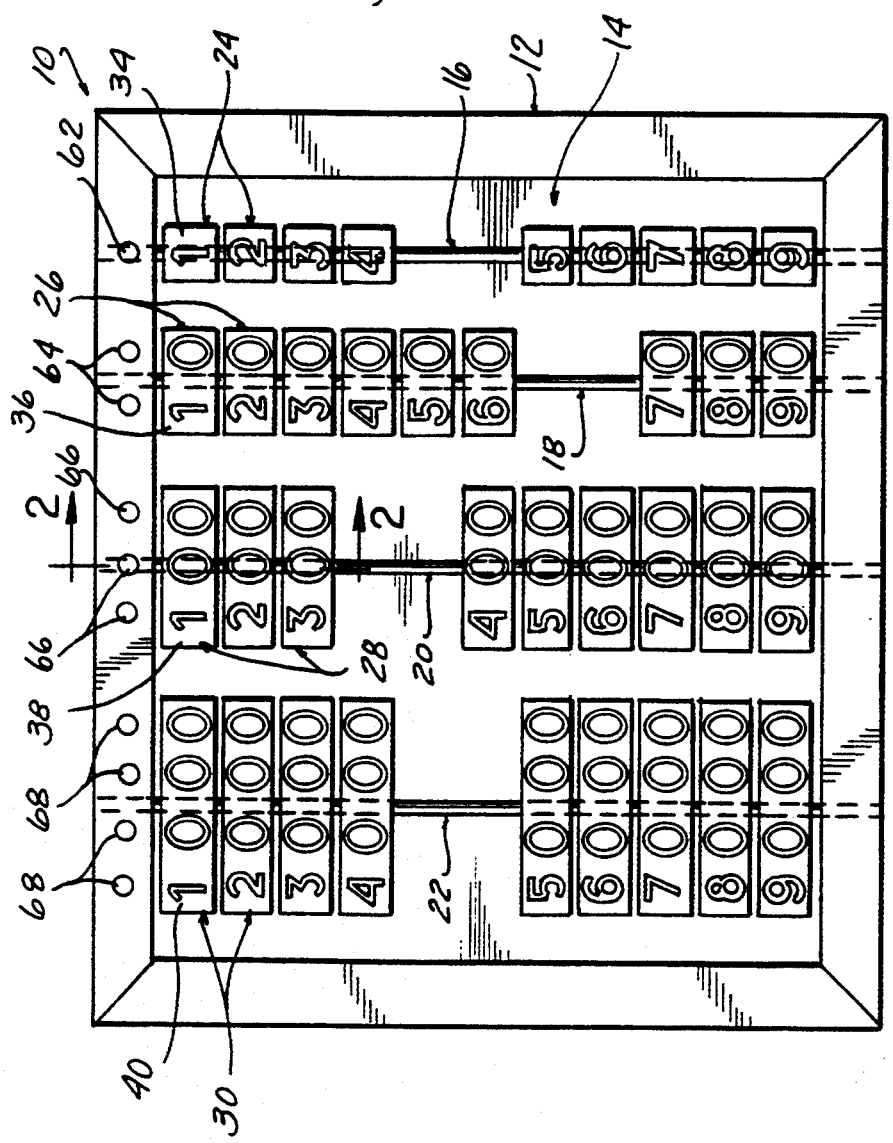
FIG. 1 is a plan view of a teaching aid according to the present invention.

Referring to the drawings, FIG. 1 shows the teaching aid 10 according to the present invention, which includes a supporting structure comprised of a rectangular frame 12 defining a central opening 14.

A series of rods 16, 18, 20, and 22 are mounted extending across the opening 14, side-by-side and parallel to each other. The rods 16, 18, 20, and 22 extend up and down as viewed in FIG. 1, and as the frame 10 is intended to be oriented in use. Each end of the rods 16, 18, 20, and 22 are fixed in the top and bottom frame members respectively to thereby be secured.

Each rod 16, 18, 20, and 22 slidably mounts a respective stack of blocks, 24, 26, 28, and 30, each movable individually along its respective rod 16, 18, 20, or 22.

Each block is a parallel-piped in shape, having six sides, and is restrained so as to always present one face to be viewable from the front of the frame 12.

This may be accomplished by providing a back panel 32 fixed to the frame 12, with the back panel 32 closely spaced to the rear face of each of the blocks 24, 26, 28, 30 to allow slidable movement along its rod 16, 18, 20, 22 but prevent rotation.

Figure 2:
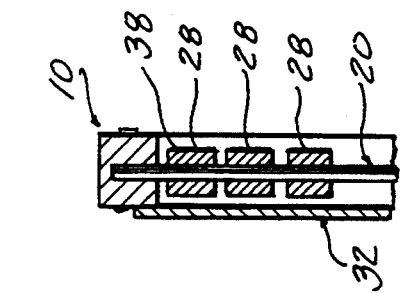
FIG. 2 is a fragmentary view of the section 2—2 in FIG. 1.
Figure 6:
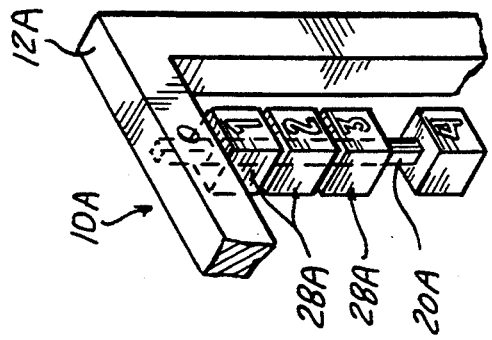
FIG. 6 is a fragmentary perspective view of an alternate embodiment of the present invention.

FIG. 6 shows an alternate form 10A of the teaching aid 10 which consists of shaping the rods, including rod 20A to have a non round cross sectional shape (such as a square) received in close fitting, complementary shaped though openings extending through the mounted blocks 28A which allows sliding but prevents rotation of the blocks 28A. A frame 12A open on both sides may thus be used.

Mounting of the blocks in grooves in a supporting structure such as a tray may also be utilized. The blocks thus confined by the suitable interfitting surface.

Each of the blocks in 24, 26, 28, and 30 in the respective stacks thus has one face 34, 36, 38 and 40 which is readily viewable from above and the front of the frame 12.

Each facing side 34 of each block 24 in the rightmost stack is imprinted with a respective cardinal number, 1-9 in order, from beginning with number 1, the second with the number 2, and so on.

Each facing side 36 of each of the blocks 26 in the second from the right stack is also imprinted in order with the cardinal numbers 1-9 in the same fashion, but also is imprinted with a single zero to the right of the ordinal number imprinted thereon.

Each facing side 38 of each of the blocks 28 in the third from the right stack is also imprinted in order with the cardinal numbers 1-9, but has two zeros imprinted just to the right of the ordinal number.

Finally, each facing side 40 of each of the blocks 30 in the fourth from the right stack is also imprinted in order with the cardinal numbers 1-9 but also accompanied by three zeros to the right of the appearing cardinal number.

The blocks 24, 26, 28, and 30 are of progressively increasing width preferably in proportion to number of digits imprinted thereon, i.e., a width proportion of 1:2:3:4 of blocks 24, 26, 28, and 30 respectively.

The blocks are preferably constructed of wood due to its warm appeal, as may be the frame 12. However, molded plastic or other materials and construction techniques can be utilized.

The various imprintings have an important color coding depicted in detail in FIG. 5A-5D.

Each of the cardinal numeral imprintings 42 on the blocks 24 in the first stack on the right is of a first particular color, designated in FIG. 5D as R.

Each of the cardinal numeral imprintings 44 of the blocks 26 in the second from the right stack is a second particular color, coded G in FIG. 5C, which color is different from the first particular color code R. The zero imprintings on the other hand are each in the first color R.

Each of the cardinal numeral imprintings 48 of the blocks 28 in the stack third from the right are imprinted in a third particular color, coded B in FIG. 5B, which differs from the first and second colors R and G. The two zeros 50, 52 imprinted to the right of the ordinal numeral imprintings 48 are colored the same respectively as the cardinal numeral imprintings 42, 44 of the blocks 24, 26.

Finally, each of the cardinal numeral imprintings 54 of the blocks 30 in the fourth from the right stack is imprinted in a fourth particular color, coded BL in FIG. 5A, which differs from each of the first three colors R, G, B of the cardinal numeral imprintings 42, 44, 48 of the blocks 26, 28, 30. The three zeros 56, 58, 60 to the right are imprinted in the same color as the respective cardinal numerals 42, 44, 48 of the blocks 26, 28, 30.

The stacks of blocks 24, 26, 28 and 30 have sufficient clearance so as to allow sliding to a separated position of one or more of these blocks from those blocks remaining in the stack, as best seen in FIG. 1.

Each of the stacks can be labeled with single, double, triple, and quadruple dot legends 62, 64, 66 and 68 to signify the increasing order of magnitudes or the "place" of the number represented by each stack.

This teaching aid has been found to very effectively promote an understanding of counting in the ten based number system.

The first stack can be thought of as representing "units" and individual blocks 24 can be slid up to represent a count in units.

Similarly, the blocks 26 in the second stack can be thought of as representing the "tens" in a count, with one or more slid upward to be separated corresponding to the "tens" count.

The blocks 28, 30 in similar fashion can be thought of as representing the "hundreds" and "thousands" count. Thus, the count shown in FIG. 1 is 4,364.

A key feature is the color coding of the zeros, 46 which may be described as "baskets" 46. Each of the zeros is color coded to the cardinal numeral of the stack corresponding to the place or order of magnitude of that zero.

While using different colors for different orders tens is a distinct advantage, this learning system can also be presented without the use of multicolor numbering.

Thus, the concept of combining the counts of each order of magnitude into a single number is easily grasped by the young child, since the color association identifying each place makes the mental association easier.

FIGS. 3 and 4 show the representation of the thousands and hundreds with the units stacks.

The count of each place is made by sliding the appropriate number of blocks upwardly to be separated from the remaining blocks in the stack.

Accordingly, the visual and tactile aspects of the abacus are utilized to reinforce and make easier the grasping of fundamental aspects of the decimal or tens number system concepts.

I claim:

1. A teaching aid for assisting in teaching counting in the tens number system, said teaching aid comprising:
    a supporting structure;
    a series of stacks of nine blocks, each stack arranged side by side;
    means mounting each of said stack of blocks to said structure so as to be individually slidable and to be spaced apart so as to enable separation of one or more blocks in each stack from the remaining blocks in said stack;
    each of the blocks in a first, rightmost stack bearing in order a respective cardinal number 1-9;
    each of the blocks in a second from the right of said stacks bearing in order a respective cardinal number 1-9;
    a zero imprinted on each of said blocks in said second stack to the right of each of said cardinal numbers thereon.

2. The teaching aid according to claim 1 wherein there are four side by side stacks of nine blocks, the blocks in each stack having a cardinal number 1-9 hereon in order in said stack, the blocks in the third stack from the right each having two zeros to the right of the number thereon the blocks in the fourth stack from the right each having three zeros to the right of the cardinal number thereon.

3. The teaching aid according to claim 2 wherein the cardinal numbers on the blocks in each of said stacks are each colored the same as each other but different than the blocks in all of the other stacks.

4. The teaching aid according to claim 3 wherein each zero to the right on the block in said second, third and fourth stack is colored the same as said cardinal number on said block in said first stack, each zero the second from the right on the blocks in said third stack of blocks are colored the same as the cardinal numbers on said blocks in said second stack, said third from the right zeros on said blocks in said fourth stack are colored the same as the cardinal numbers on said blocks in said third stack.

5. The teaching aid according to claim 2 wherein all of the blocks in said second stack are twice as wide as said blocks in said first stack, all of said blocks in said third stack are three times as wide as said blocks in said first stack, and all of said blocks in said fourth stack are four times as wide as the blocks in said first stack.

6. The teaching aid according to claim 5 wherein said means mounting said blocks includes a series of parallel rods, each rod having a respective stack of blocks slidable thereon.

7. The teaching aid according to claim 1 wherein all of the blocks in said stack are wider than the blocks in the first stack.

8. The teaching aid according to claim 1 wherein said blocks are parallel piped having six rectangular faces and said means mounting said blocks constrains one face of each of said block to face one side of said support frame, said one faces of said blocks having said cardinal numerals and zeros thereon.

* * * * *